(12) United States Patent
Sykora et al.

(10) Patent No.: US 11,593,797 B2
(45) Date of Patent: Feb. 28, 2023

(54) AUTHENTICATION USING A SECURE CIRCUIT

(71) Applicant: Apple Inc., Cupertino, CA (US)

(72) Inventors: Libor Sykora, Prague (CZ); Delfin J. Rojas, San Jose, CA (US); Paul J. Sholtz, Santa Clara, CA (US); Erika Misaki, San Francisco, CA (US); Shiva Krovi, San Francisco, CA (US); Lawrence Aung, San Francisco, CA (US); Julien Lerouge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1085 days.

(21) Appl. No.: 15/275,281

(22) Filed: Sep. 23, 2016

(65) Prior Publication Data

US 2017/0357967 A1 Dec. 14, 2017

Related U.S. Application Data

(60) Provisional application No. 62/349,053, filed on Jun. 12, 2016.

(51) Int. Cl.
*H04L 9/32* (2006.01)
*G06Q 20/38* (2012.01)
(Continued)

(52) U.S. Cl.
CPC ......... *G06Q 20/3829* (2013.01); *G06Q 20/12* (2013.01); *G06Q 20/3223* (2013.01);
(Continued)

(58) Field of Classification Search
CPC ............... G06Q 20/3829; G06Q 20/12; G06Q 20/3223; G06Q 20/3227; G06Q 20/3825;
(Continued)

(56) References Cited

U.S. PATENT DOCUMENTS 8,775,757 B2 7/2014 Polzin et al.
2007/0081667 A1* 4/2007 Hwang ................. H04L 9/3271
380/30

(Continued)

OTHER PUBLICATIONS

Timothy R. Paaske, et al., "Secure Public Key Acceleration," U.S. Appl. No. 14/498,820, filed Sep. 26, 2014.

*Primary Examiner* — Neha Patel
*Assistant Examiner* — Chunling Ding
(74) *Attorney, Agent, or Firm* — Kowert, Hood, Munyon, Rankin & Goetzel, P.C.; Mark D. Seegers; Dean M. Munyon (57) ABSTRACT

Techniques are disclosed relating to authentication using public key encryption. In one embodiment, a computing device includes a secure circuit, a processor, and memory. The secure circuit is configured to generate a public key pair usable to authenticate a user of the computing device. The memory has program instructions stored therein that are executable by the processor to cause the computing device to perform operations including authenticating the user with a server system by sending authentication information supplied by the user. The operations further include, in response to the server system verifying the authentication information, receiving a first token usable to register the public key pair with the server system and sending, to the server system, a request to register the public key pair for authenticating the user. In such an embodiment, the request includes the first token and identifies a public key of the public key pair.

13 Claims, 9 Drawing Sheets

(51) Int. Cl.
*H04L 9/40* (2022.01)
*G06Q 20/12* (2012.01)
*G06Q 20/40* (2012.01)
*G06Q 20/32* (2012.01)
*H04W 12/069* (2021.01)

(52) U.S. Cl.
CPC ....... *G06Q 20/3227* (2013.01); *G06Q 20/385* (2013.01); *G06Q 20/3825* (2013.01); *G06Q 20/40145* (2013.01); *H04L 9/3268* (2013.01); *H04L 63/08* (2013.01); *H04L 63/083* (2013.01); *H04L 63/0823* (2013.01); *H04L 63/0861* (2013.01); *H04L 63/126* (2013.01); *H04W 12/069* (2021.01); *G06Q 2220/00* (2013.01); *H04L 2209/56* (2013.01); *H04L 2209/80* (2013.01)

(58) Field of Classification Search
CPC .......... G06Q 20/385; G06Q 20/40145; G06Q 2220/00; H04L 9/3268; H04L 63/08; H04L 63/0832; H04L 63/083; H04L 63/0861; H04L 63/126; H04L 63/0823; H04L 2209/56; H04L 2209/80; H04W 12/06; H04W 12/069
See application file for complete search history.

(56) References Cited

U.S. PATENT DOCUMENTS

| | | | |
|---|---|---|---|
| 2008/0120504 A1* | 5/2008 | Kirkup | H04L 9/3226 713/176 |
| 2010/0088507 A1* | 4/2010 | Cho | G06F 21/33 713/156 |
| 2012/0005526 A1* | 1/2012 | Sela | G06F 21/78 713/168 |
| 2013/0297513 A1* | 11/2013 | Kirillin | G06Q 40/02 705/67 |
| 2014/0013406 A1* | 1/2014 | Tremlet | G09C 1/00 726/5 |
| 2014/0089617 A1* | 3/2014 | Polzin | G06F 12/1441 711/E12.091 |
| 2014/0351589 A1* | 11/2014 | Chenna | H04W 12/068 713/168 |
| 2015/0371026 A1* | 12/2015 | Gnanasekaran | H04L 63/0823 726/7 |
| 2016/0065374 A1 | 3/2016 | Sauerwald et al. | |
| 2016/0205096 A1* | 7/2016 | Hoyos | G06Q 20/40145 705/72 |
| 2016/0269393 A1* | 9/2016 | Corella | H04L 9/3247 |
| 2017/0109512 A1* | 4/2017 | Bower | G06F 21/32 |
| 2017/0141926 A1* | 5/2017 | Xu | H04L 9/3297 |
| 2018/0167208 A1* | 6/2018 | Le Saint | H04L 9/0844 |
| 2018/0218358 A1* | 8/2018 | Mardikar | H04W 4/80 |
| 2018/0332029 A1* | 11/2018 | Abidin | H04L 63/0884 |

* cited by examiner

AUTHENTICATION USING A SECURE CIRCUIT

This application claims the benefit of U.S. Prov. Appl. No. 62/349,053 filed on Jun. 12, 2016, which is incorporated by reference herein in its entirety.

BACKGROUND

Technical Field

This disclosure relates generally to processors, and, more specifically, to processors that use public key encryption.

Description of the Related Art

Many people now prefer to visit online stores to make purchases because of the added convenience over visiting traditional brick and mortar stores. When visiting an online store, a user may view multiple items, which can be added to a shopping cart for later review and eventual check out. To expedite the purchasing process, an online store may maintain shipping information and/or payment information for a user, so that the user does not have to reenter this information for each purchase. In order to protect this information, a user is typically asked to authenticate by providing some user credential such as a user name and password.

SUMMARY

In various embodiments, a computing device is disclosed that includes a secure circuit usable to facilitate authenticating a user. The secure circuit may be configured to generate a public key pair usable to authenticate a user of the computing device. The computing device may authenticate the user with a server system by sending authentication information supplied by the user to the server system. In response to the server system verifying the authentication information, the computing device may receive a first token usable to register the public key pair with the server system. The computing device may send, to the server system, a request to register the public key pair for authenticating the user, and the request may include the first token and identify a public key of the public key pair. In some embodiments, the computing device performs a subsequent authentication for the user that includes receiving a challenge from the server system, requesting that the secure circuit generate, with a private key of the public key pair, a digital signature for the challenge, and providing the digital signature to the server system in a response to the challenge.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform a cryptographic operation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to physical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a user may authenticate with an entity via a digital signature generated by a secure circuit in the user's computing device (as opposed to repeatedly being required to enter a credential each time the user wants to authenticate with the entity). As will be described in greater detail below, in various embodiments, the computer device may perform a registration process for a public key pair generated by the secure circuit in order to begin authenticating using a digital signature generated by a private key of the pair. The process may begin with the computing device establishing trust with a server system of the entity by presenting authentication information of the user to the server system. After the server system successfully verifies this information, the server system may generate an indication that trust has been established with the computing device and, in some embodiments, may present the indication as a token to the computing device (or store it in the system in other embodiments). In response to receiving this token, the computing device submit a request to register a public key pair generated by the secure circuit in the device. This request may include the token and information indicative of the public key of the pair (e.g., the public key or a hash of the public key). After verifying the token, the server system may register the public key pair allowing the computing device to later generate a digital signature in order to authenticate the user.

In some embodiments, this registration process may be performed within the context of making a purchase using the computing device. That is, a user may establish trust with the server system when attempting to make a purchase, and the user's computing device may receive a token allowing the computing device to register a public key pair. In other words, the computing device may leverage the trust established to authorize a purchase in order to register a public key pair. This public key pair may then be used to authenticate for making future purchases.

In various embodiments, the computing device restricts access to generating digital signatures by using a biosensor included in the computing device. In such an embodiment, the biosensor may be configured to collect biometric information from a biometric credential presented by the user—e.g., fingerprint information from the user's finger. The biosensor may present this information to the secure circuit, which compares the information against previously stored biometric information of the user. If a match is detected, the secure circuit may generate a digital signature for authenticating the user. If a match is not detected, the secure circuit may decline a request to generate the digital signature.

Examples of the registration process is described in greater detail below with respect to FIGS. 1A and 2A-2C. Examples of a process for making purchases are described in greater detail below with respect to FIGS. 1B and 3. An example of a key cancellation is discussed with respect to FIG. 4. An example of contents within the secure circuit is discussed below with respect to FIG. 5. Embodiments of related methods are described with respect to FIGS. 6A-6C.

Figure 1A:
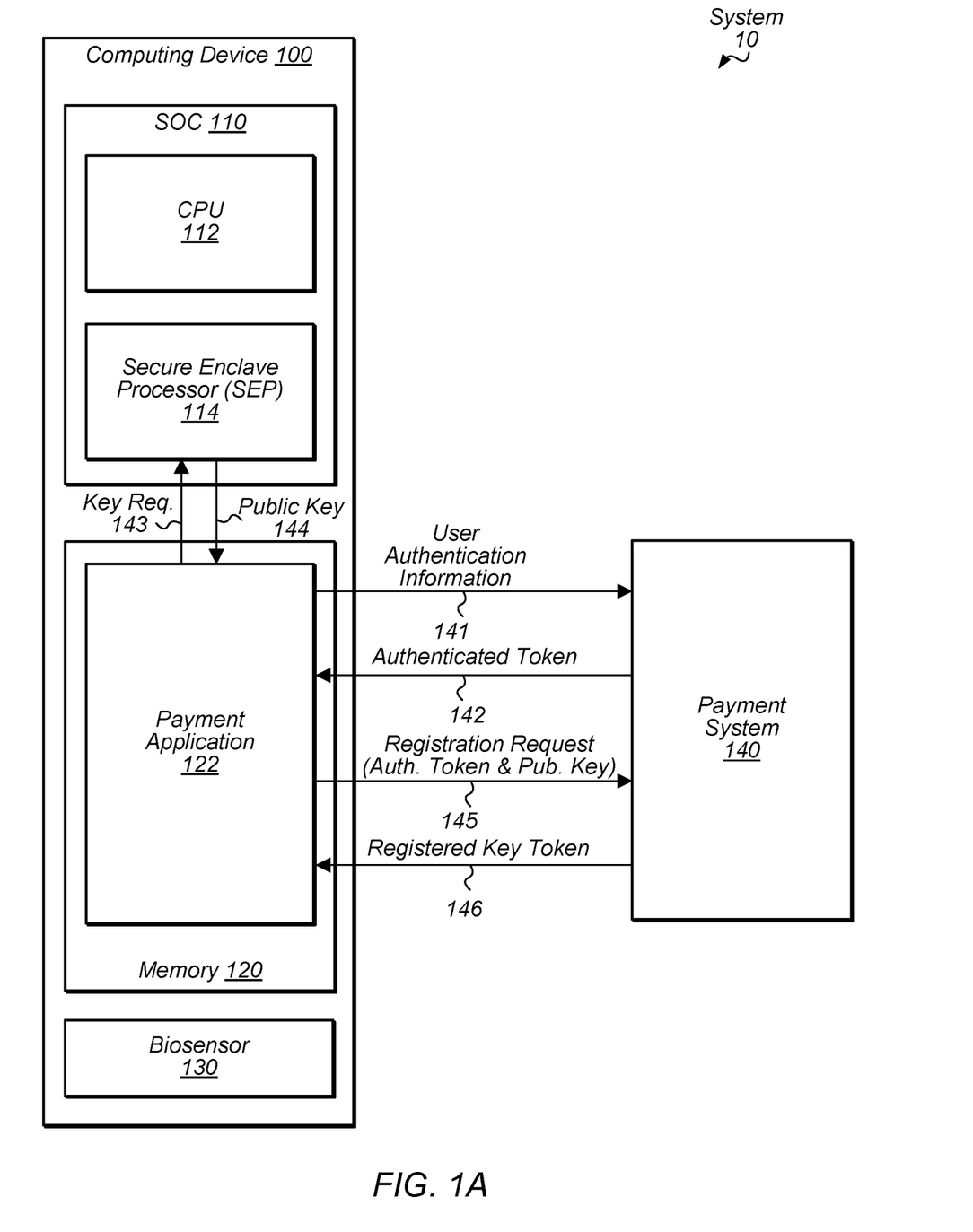
FIGS. 1A and 1B are block diagrams illustrating examples of a system for authenticating using a public key pair generated by a secure circuit in a computing device.

Turning now to FIG. 1A, a block diagram of a system 10 during registration of a public key pair for authentication is depicted. In the illustrated embodiment, system 10 includes a computing device 100 and a payment system 140. Computing device 100 may correspond to any suitable computer system. Accordingly, in some embodiments, device 100 may be a mobile device (e.g., a mobile phone, a tablet, personal data assistant (PDA), etc.), desktop computer system, server system, network device (e.g., router, gateway, etc.), microcontroller, etc. In the illustrated embodiment, computing device 100 includes a system on a chip (SOC) 110, memory 120, biometric sensor 130 (more briefly "biosensor" 130). As implied by the name SOC, the components of the SOC 110 may be integrated onto a single semiconductor substrate as an integrated circuit chip. In some embodiments, the components may be implemented on two or more discrete chips in a system. As shown, SOC 110 may include a central processing unit (CPU) 112 configured to execute a payment application 122 stored in memory 120. SOC 110 may also include a secure enclave processor (SEP) 114. In some embodiments, system 10 may be implemented differently than shown.

Payment application 122, in one embodiment, is an application that allows a user to request payments for various purchases. In some embodiments, application 122 may present a store front that offers products and/or services available for purchase. For example, in one embodiment, application 122 may present various digital content available for purchase such as music, videos, books, and/or applications. Once a user has selected a particular item for purchase, application 122 may communicate with payment system 140 in order to facilitate payment for the purchase.

Payment system 140, in one embodiment, is a server system (i.e., a collection of one or more server computers) that processes payment requests from an application 122. In various embodiments, system 140 may maintain various payment information about a user, such as a user's billing address and credit card information, in order to facilitate processing a payment request. When a user wants to submit payment for a purchase, an application 122 may present authentication information for the user in order to use the existing payment information stored in system 140. In some embodiments, this authentication information may include a user name and password entered into computing device 100 via a touch screen of device 100, keyboard, or other form of interface. If system 140 is able to successfully verify this information, system 140 may allow the previously stored payment information to be used in making a payment for a purchase. As will be discussed below, in various embodiments, system 140 may allow a payment application 122 to register a public key pair for authenticating instead of asking the user to renter his or her authentication information for each purchase.

Secure enclave processor (SEP) 114 is one embodiment of a secure circuit or a secure component configured to generate and maintain a public key pair, which may be used for authentication. As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. As will be described below, these services may include various cryptographic services such as authentication, encryption, decryption, etc. Secure services may include secure key generation, which may include shared secret keys and asymmetric keys (i.e., public and private keys). In some embodiments, SEP 114 may determine whether to perform a requested operation, such as generating a digital signature, based on biometric information collected by biosensor 130 in order to confirm that the requested operation is associated with an authorized user.

Biosensor 130, in one embodiment, is configured to detect biometric data for a user of computing device 100. Biometric data may be data that uniquely identifies the user among other humans (at least to a high degree of accuracy) based on the user's physical or behavioral characteristics. For example, in some embodiments, sensor 130 is a finger print sensor that captures fingerprint data from the user. In one embodiment, SEP 114 may maintain previously captured fingerprint data of an authorized user and compare it against newly received fingerprint data from sensor 130 in order to authenticate a user. (In another embodiment, biosensor 130 may perform the comparison.) If the fingerprint data matches, SEP 114 may permit performance of a requested service. In some embodiments, communications between SEP 114 and biosensor 130 may be encrypted using a key shared between SEP 114 and biosensor 130 such that another circuit (e.g., CPU 112) is unable to view communicated fingerprint data. In some embodiments, other types of biometric data may be captured by sensor 130 such as voice recognition (identifying the particular user's voice), iris scanning, etc. It is noted that SEP 114 may also compare information collected from sources other than sensor 130 in order to verify the identity of a user, in some embodiments. Accordingly, computing device 100 may include other user interface circuits (e.g., a touch screen) configured to receive authentication information (e.g., a passcode or password) from a user, and SEP 114 may verify that the received authentication information is correct.

In various embodiments, payment application 122 may perform a registration process for a public key pair generated by SEP 114 in order to allow a user to subsequently authenticate with payment system 140 using a digital signature generated by a private key of the pair and without having to provide a user name and password. In the illustrated embodiment, this registration process includes the communication of elements 141-146 discussed below. It is noted, while various authentication techniques are described herein within the context of facilitating payment processing, these techniques may also be used in other embodiments in which authentication is used for some purpose other than making a purchase.

As shown, the registration process may begin with payment application 122 communicating user authentication information 141 to payment system 140 in order to establish trust between computing device 100 and payment system 140. As will be discussed below with respect to FIG. 2A, in some embodiments, this information 141 may be communicated to system 140 in response to a user's request to authenticate using a biometric credential supplied by the user. For example, in one embodiment, a user may select a setting in application 122 to enable authentication in this manner. As will be discussed below with respect to FIG. 2A, in some embodiments, information 141 may be communicated in response to a user requesting to purchase an item. In some embodiments, authentication information 141 may include a user name and password enter by the user into, for example, a touch screen of device 100. In other embodiments, authentication information 141 may include one or more values (e.g., a password equivalent token (PET) discussed below with FIGS. 2A-2C) derived from a user name and password provided by the user. In some embodiments, authentication information 141 may also include a unique account identifier for the user (referred to below as DSID), a machine identifier (MID) that uniquely identifies computing device 100, and/or a one-time token (OTP). Authentication information 141 may, however, include any suitable information to establish trust with system 140. In response to system 140 verifying information 141, application 122 may receive a token 142.

Authenticated token 142, in one embodiment, is an indication that trust has been established with payment system 140—e.g., that the user has been authenticated. In some embodiments, token 142 may include a portion (or all) of information 141, which has been signed by system 140. Although shown in FIG. 1A as being provided to application 122, in some embodiments, system 140 may merely store token 142 locally (i.e., in a memory of system 140) for future retrieval. In various embodiments, authenticated token 142 may be used to register a public key pair generated by SEP 114 with payment system 140.

In response to receiving a token 142 (or in conjunction with sending information 141), payment application 122 may issue a key request 143 to SEP 114 to generate a public key pair to be registered with payment system 140. In some embodiments, a key request 143 may be issued after a user has requested to authenticate with a biometric credential. In response to receiving a request 143, SEP 114 may generate the key pair and return the public key 144 of the pair. In some embodiments, SEP 114 may store the key pair with usage criteria indicating that the private key cannot be used to generate a digital signature without first confirming biometric information received from biosensor 130.

After receiving a public key 144 and a token 142, application 122 may issue a registration request 145 to payment system 140 in order to register the public key pair generated by SEP 114. In the illustrated embodiment, request 145 includes authenticated token 142 and public key 144. Notably, in including token 142, application 122 is leveraging the previous trust established earlier with the communication of information 141. In cases where information 141 was communicated to facilitate a purchase, application 122 does not have to ask the user to provide information 141 multiple times—e.g., once to initiate payment and again to register a public key pair. In some embodiments, request 145 may include (or be accompanied with) additional information such as a DSID, MID, a digital signature generated by a device key stored in SEP 114 that is separate from the public key pair, etc. In some embodiments, registration request 145 is a certificate signing request (CSR), which may be in compliance with a standard format such as defined by the public-key cryptography standards (PKCS) #10 specification. In such an embodiment, system 140 may act as a certificate authority (CA). In response to verifying the information in a request 145, payment system 140 may provide a corresponding registered key token 146.

Register key token 146, in one embodiment, indicates that a particular public key pair has been registered and may be used to verify a digital signature generated by the private key of the pair. As will be discussed below with FIG. 1B, application 122 may provide this token 146 when presenting a digital signature to authenticate with system 140. In other embodiments, payment system 140 may store token 146 locally for subsequent authentications. In some embodiments, token 146 may identify the public key of the registered pair by including the public key (or a hash of the public key), which may be signed by system 140. In some embodiments, token 146 may include additional information such as the DSID, MID, an expiration period for the registration, etc. In some embodiments, token 146 is a certificate in compliance with a standard format such as the X.509 standard. In various embodiments, application 122 may continue to maintain token 146 so that it can be used for multiple subsequent authentications using the public key pair. In one such embodiment, token 146 may be usable even after computing device 100 has been restarted. That is, application 122 does not have to resubmit authentication information 141 and reregister a public key pair after device 100 has performed a boot sequence.

Figure 1B:
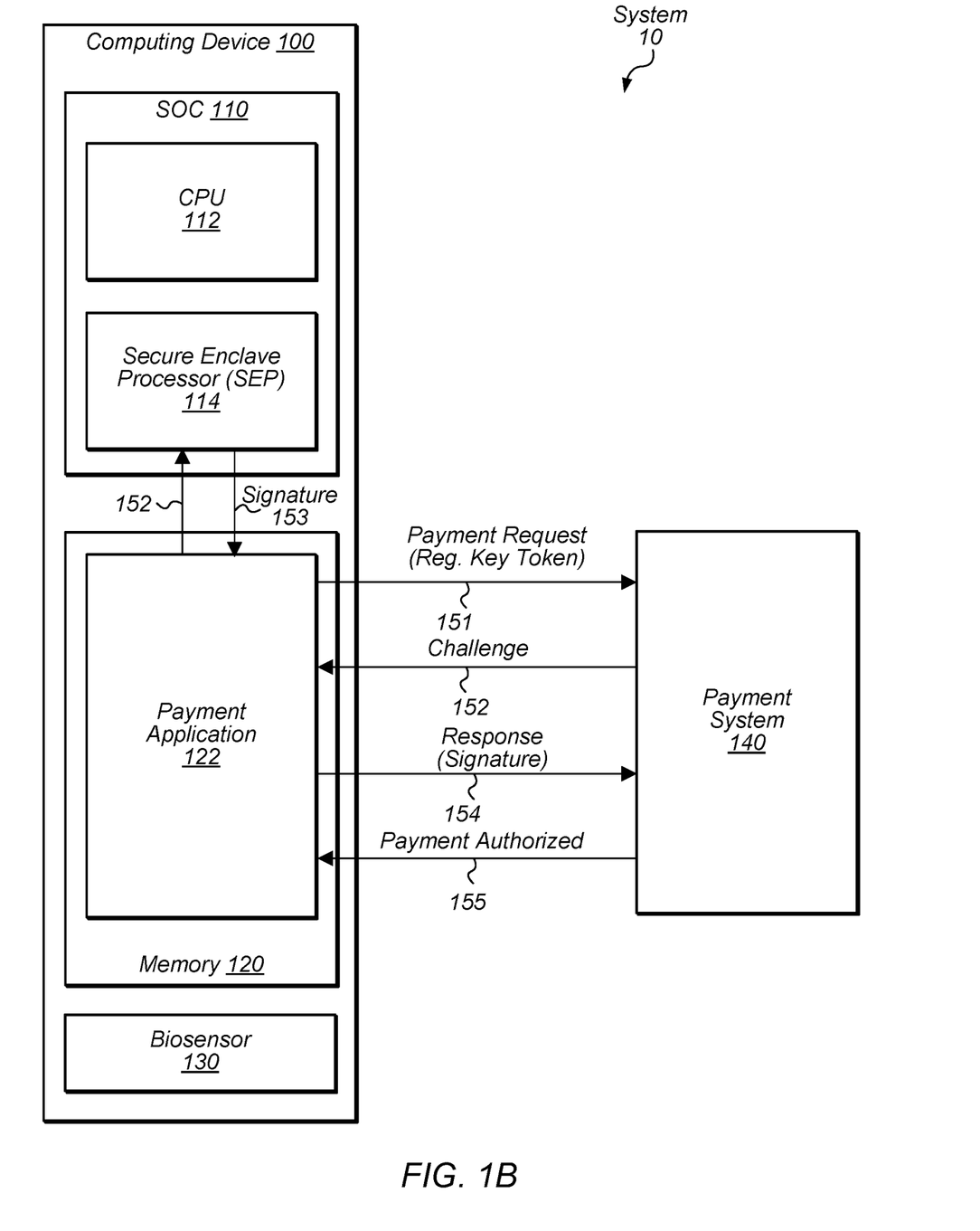

Turning now to FIG. 1B, a block diagram of system 10 during authentication using a register public key pair is depicted. In the illustrated embodiment, this authentication is performed via elements 151-155. In other embodiments, the authentication may be performed differently than shown.

In the illustrated embodiment, the authentication process begins with a payment request 151 to initiate making payment for a purchase. In some embodiments, this request 151 may include the registration token 146 obtained during registration of the public key pair as discussed above. In other embodiments, this token may be submitted later such as with the challenge response 154. In response to receiving this request 151, payment system 140 may issue a corresponding challenge 152 to verify that device 100 is in possession of the previously registered public key pair. In some embodiments, this challenge includes random data, which may be derived using a pseudo-random number generator with the token 146 being used as a seed.

After receiving a challenge 152, payment application 122 may provide the challenge 152 to SEP 114 along with a request for SEP 114 to generate a signature 153 using the private key of the registered public key pair. Before generating the signature 153, SEP 114 may ask biosensor 130 to collect biometric information from a biometric credential supplied by the user in order to determine that an authorized user is present. Upon successfully confirming the biometric information, SEP 114 may generate the requested signature 153. Payment application 122 may then convey this signature 153 in a response 154 to the challenge 152. If payment system 140 is able to successfully determine that the signature 153 is valid, payment system 140 may authorize payment for the requested purchase and notify payment application 122 that payment has been authorized by providing an indication 155.

Figure 2A:
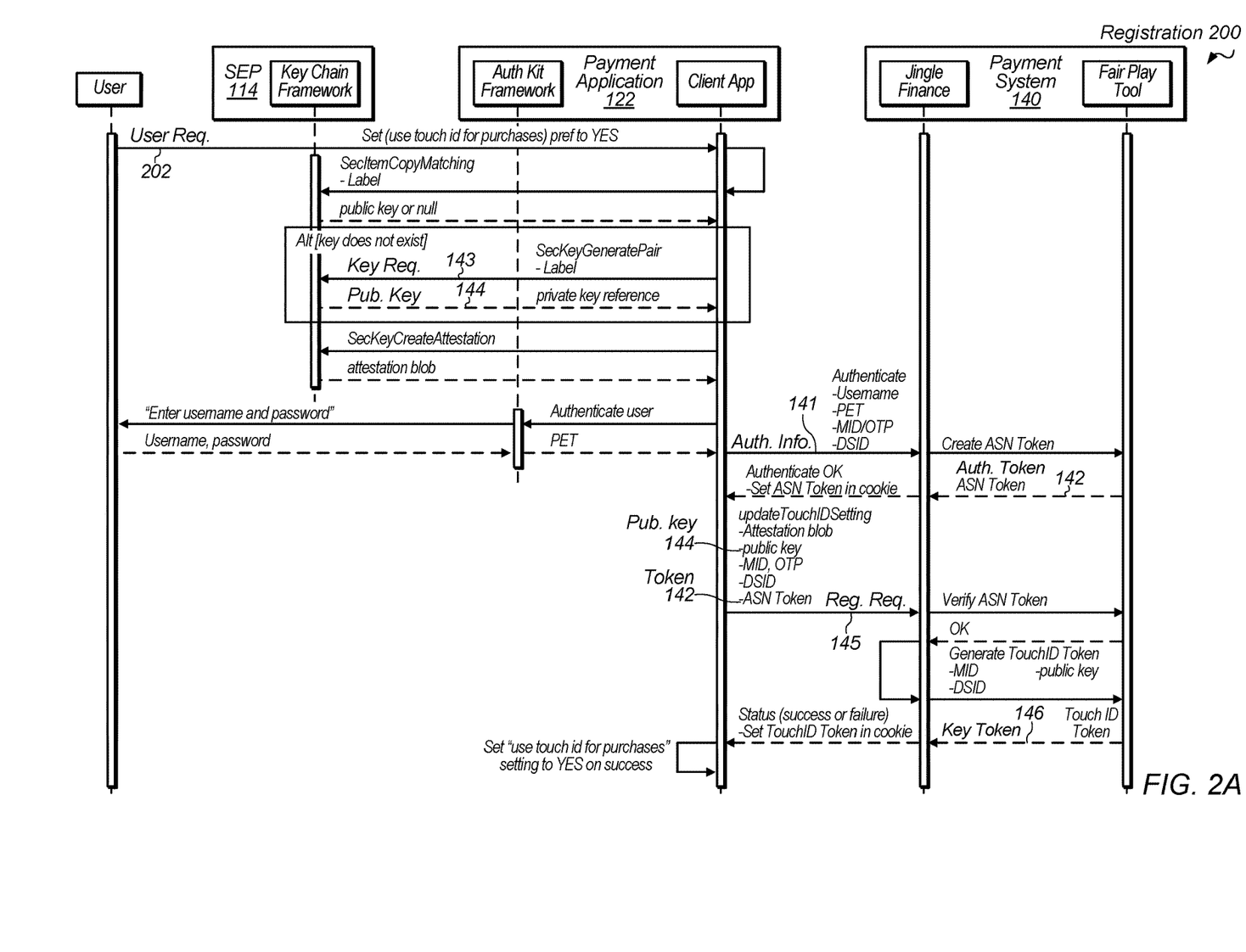
FIGS. 2A-2C are communication diagrams illustrating examples of an exchange to establish trust and register a public key pair.

Turning now to FIG. 2A, a communication diagram of an exchange between a user, SEP 114, payment application 122, and payment system 140 for a registration 200 of a public key pair is depicted. In the illustrated embodiment, registration 200 is performed in response to a user making a request 202 to authenticate with system 140 using biosensor 130 (referred to as "touch id" in FIGS. 2A-4). In response to this request, payment application 122 may issue a key request 143 for SEP 114 to generate a public key pair and receive the public key 144 of the pair. Application 122 may then convey authentication information 141 and receive authenticated token 142. After receiving this token from system 140, application 122 may issue a registration request 145 including the public key 144 and token 142 to system 140. After system 140 verifies this information, system 140 may provide a registered key token 146.

Figure 2B:
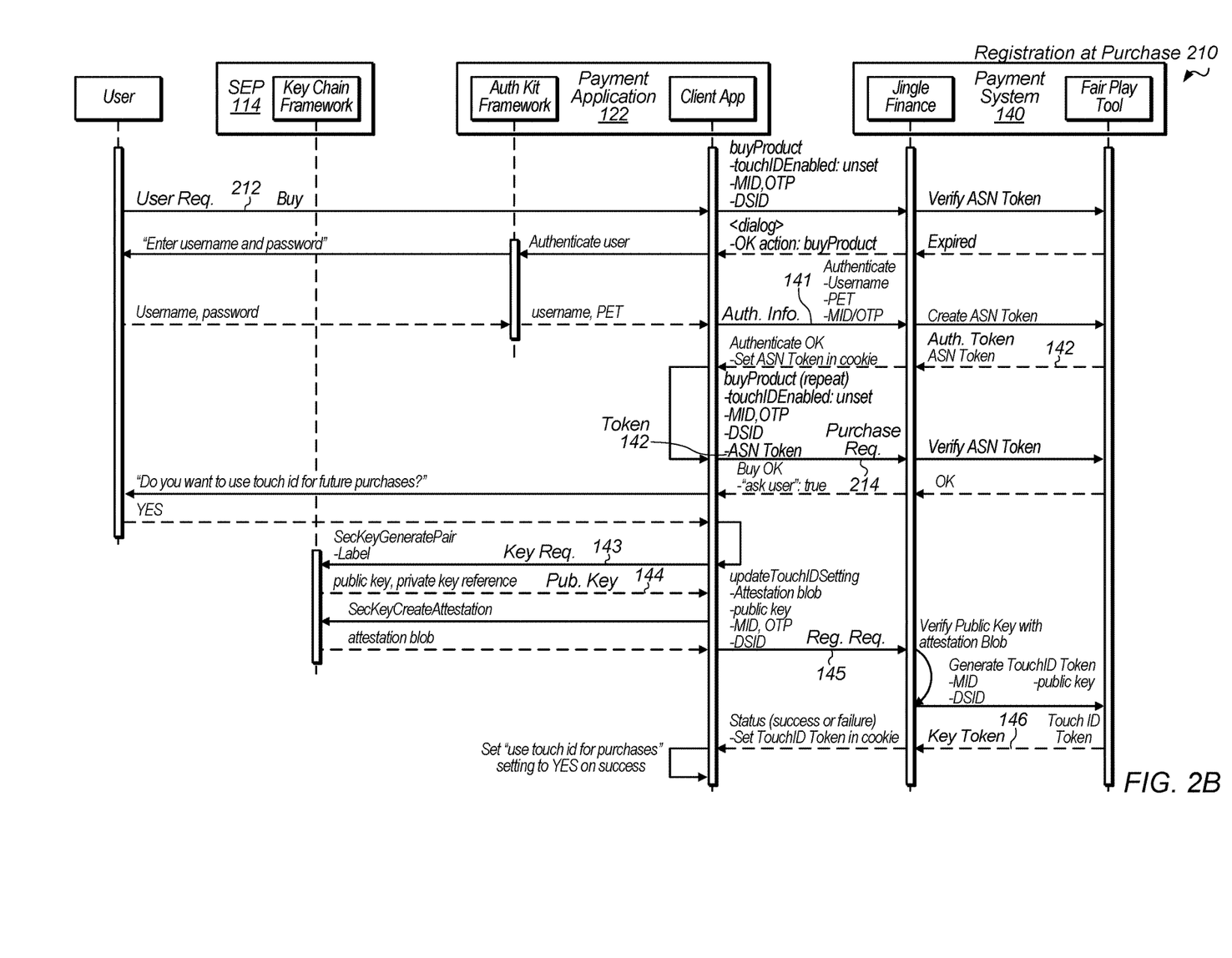

Turning now to FIG. 2B, a communication diagram of an exchange between a user, SEP 114, payment application 122, and payment system 140 for a registration 210 of a public key pair is depicted. In the illustrated embodiment, registration 210 is performed in response to a user making a request 212 to make a purchase. When receiving this request 212, payment application 122 may provide information 141 as shown and receive a corresponding authenticated token 142. Application 122 may then issue a purchase request 214 including the token 142. After the purchase has been processed, application 122 may issue a key request 143 to SEP 114 and receive a public key 144. Application 122 may then issue a registration request 145 including this key. In the illustrated embodiment, request 145 does not include the token 142 as system 140 temporarily maintains the token 142 from request 214. Upon receiving the request 145, system 140 may return a registered key token 146.

Figure 2C:
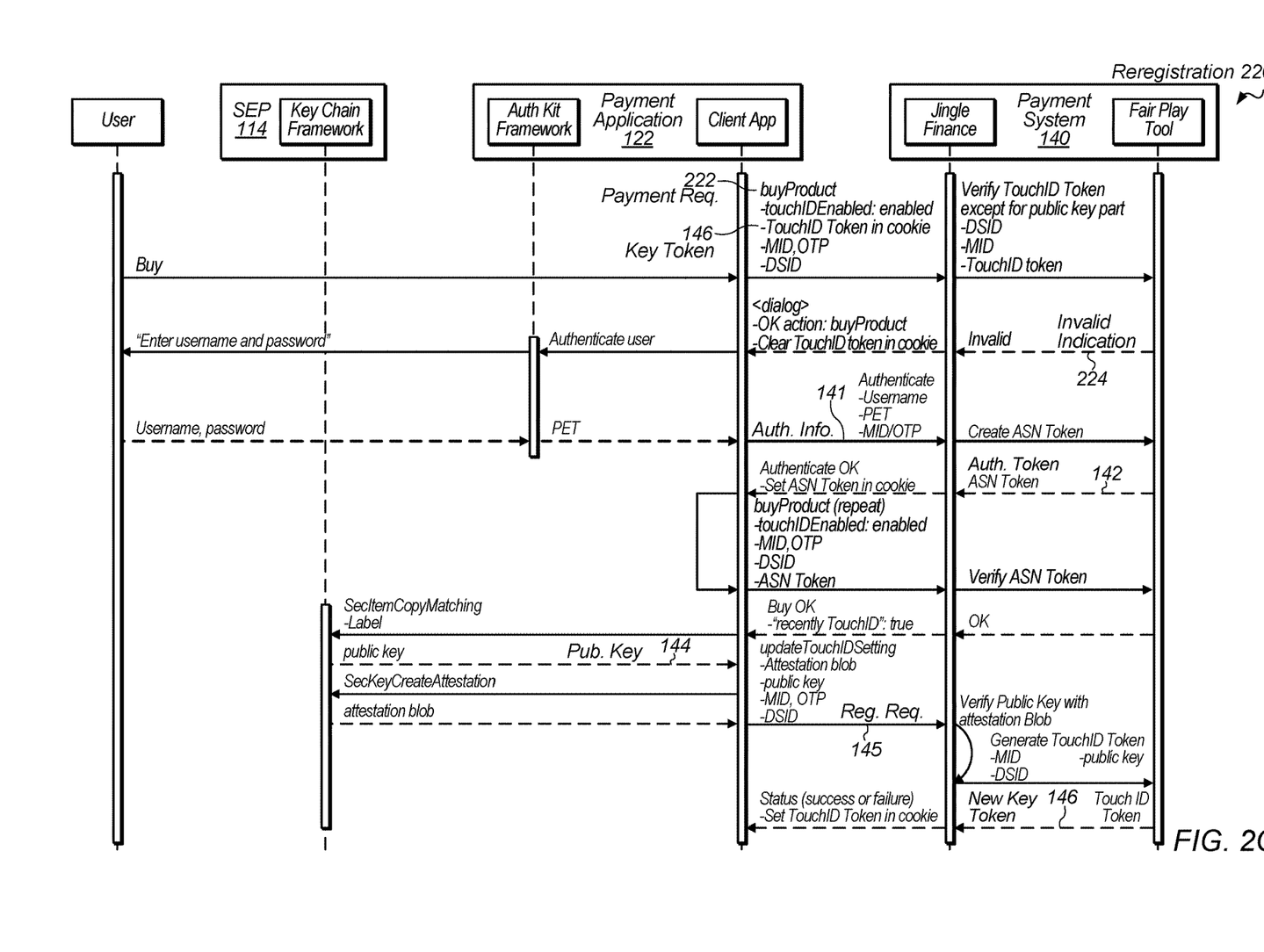

Turning now to FIG. 2C, a communication diagram of an exchange between a user, SEP 114, payment application 122, and payment system 140 for a registration 220 of a public key pair is depicted. In the illustrated embodiment, registration 220 is performed in response to application 122 submitting a payment request 222 that includes a key token 146 that is no longer valid. As shown, application 122 may receive an indication 224 of the token's invalidity. As a result, application 122 may need to resubmit elements 141-145 to get a new token 146 as shown.

Figure 3:
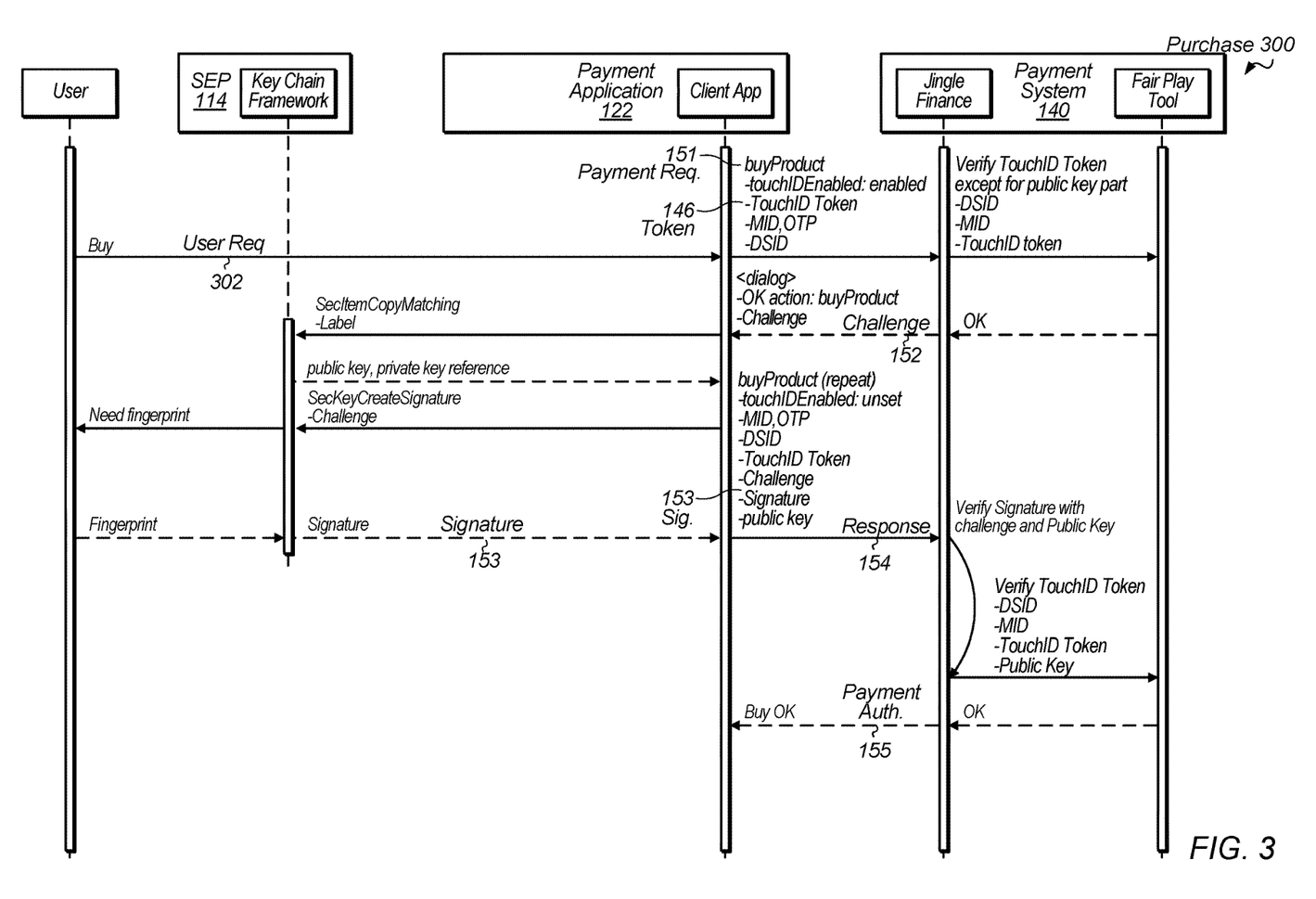
FIG. 3 is a communication diagram illustrating an example of a payment process in which a user is authenticated.

Turning now to FIG. 3, a communication diagram of an exchange between a user, SEP 114, payment application 122, and payment system 140 for a purchase 300 using a previously registered public key pair is depicted. In the illustrated embodiment, purchase 300 is performed in response to a user request 302 to purchase an item. As shown, payment application 122 may issue a payment request 151 to system 140 to initiate the payment process. In the illustrated embodiment, this request includes the registered key token 146. Upon receiving this request 151, payment system 140 may issue a challenge 152, which is conveyed by application 122 to SEP 114. After verifying fingerprint information of the user, SEP 114 may generate a corresponding signature 153 and send it to application 122. Application 122, in turn, may send a response 154 to the challenge 152 and include the signature 153. After verifying this information, payment system 140 may send an indication 155 that payment has been authorized.

Figure 4:
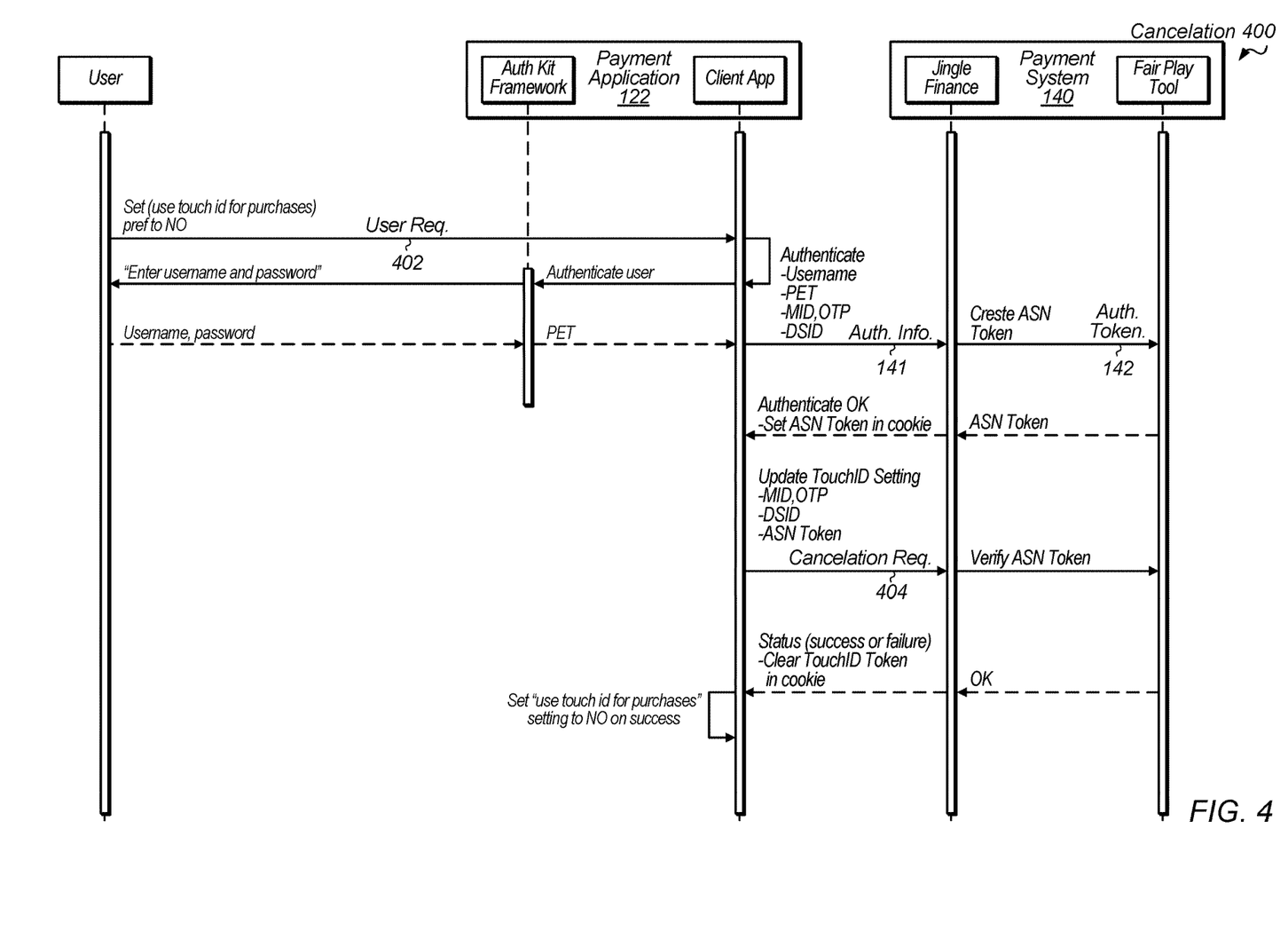
FIG. 4 is a communication diagram illustrating an example of a cancellation process.

Turning now to FIG. 4, a communication diagram of an exchange between a user, SEP 114, payment application 122, and payment system 140 for a cancellation 400 is depicted. In the illustrated embodiment, cancellation 400 is performed in response to a user request 402 to discontinue using biosensor 130 to authenticate. As shown, after receiving this request, application 122 may submit authentication information 141 to system 140 in order to receive a token 142. Application 122 may then submit a cancellation request 404 to update the settings for the registered public key pair on system 140.

Figure 5:
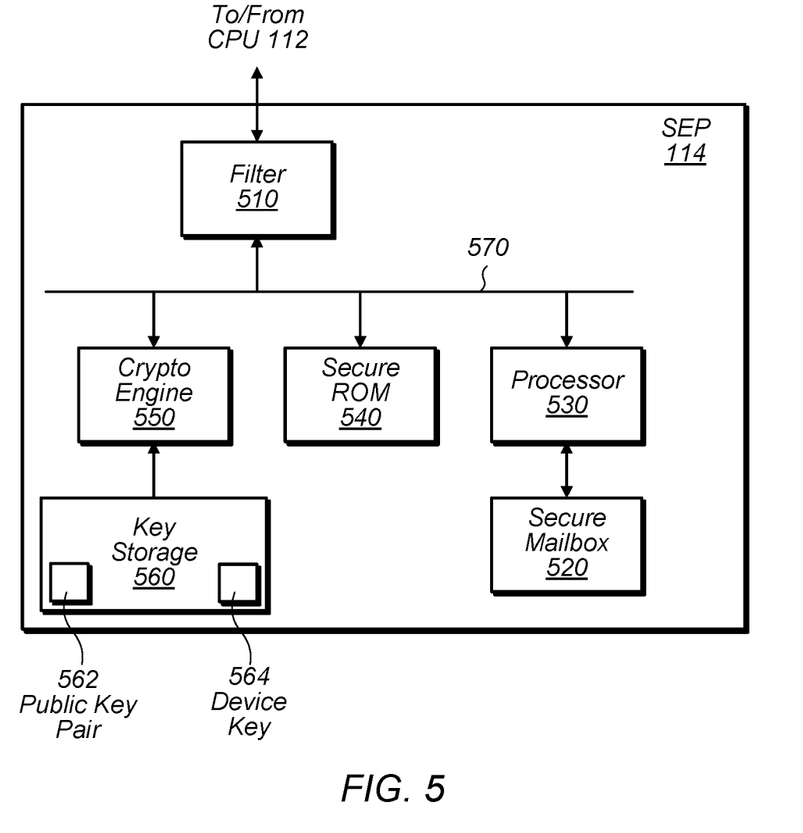
FIG. 5 is a block diagram illustrating an example of components in the secure circuit.

Turning now to FIG. 5, a block diagram of additional components in SEP 114 is depicted. In the illustrated embodiment, SEP 114 includes a filter 510, secure mailbox 520, processor 530, secure ROM 540, cryptographic engine 550, and key storage 560 coupled together via an interconnect 570. In some embodiments, SEP 114 may include more (or less) components than shown in FIG. 5. As noted above, SEP 114 is a secure circuit that protects an internal, resource such as components 530-560 and keys 562 and 564. As discussed below, SEP 114 implements a secure circuit through the use of filter 510 and secure mailbox 520.

Filter 510 is circuitry configured to tightly control access to SEP 114 to increase the isolation of the SEP 114 from the rest of the computing device 100, and thus the overall security of the device 100. More particularly, in one embodiment, filter 510 may permit read/write operations from a CPU 112 (or other peripherals on a fabric coupling CPU 112 and SEP 114) to enter SEP 114 only if the operations address the secure mailbox 520. Other operations may not progress from the fabric 150 into SEP 114. Even more particularly, filter 510 may permit write operations to the address assigned to the inbox portion of secure mailbox 520, and read operations to the address assigned to the outbox portion of the secure mailbox 520. All other read/write operations may be prevented/filtered by the filter 510. In some embodiments, filter 510 may respond to other read/write operations with an error. In one embodiment, filter 510 may sink write data associated with a filtered write operation without passing the write data on to local interconnect 570. In one embodiment, filter 510 may supply nonce data as read data for a filtered read operation. Nonce data (e.g., "garbage data") may generally be data that is not associated with the addressed resource within the SEP 114. Filter 510 may supply any data as nonce data (e.g. all zeros, all ones, random data from a random number generator, data programmed into filter 510 to respond as read data, the address of the read transaction, etc.).

In various embodiments, filter 510 may only filter incoming read/write operations. Thus, the components of the SEP 114 may have full access to the other components of computing device 100 including CPU 112, memory 120, and biosensor 130. Accordingly, filter 510 may not filter responses from fabric 150 that are provided in response to read/write operations issued by SEP 114.

Secure mailbox 520 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 112. The outbox may store write data from write operations sourced by processor 530. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 112 (e.g., application 122) may request services of SEP 114 via an application programming interface (API) supported by an operating system of computing device 100—i.e., a requester may make API calls that request services of SEP 114. These calls may cause corresponding requests to be written to mailbox mechanism 520, which are then retrieved from mailbox 520 and analyzed by processor 530 to determine whether it should service the requests. Accordingly, this API may be used to request the generation of a public key pair as well as generation of a signature 153. By isolating SEP 114 in this manner, secrecy of maintained keys 562 and 564 may be enhanced.

SEP processor 530 is configured to process commands received from various sources in computing device 100 (e.g. from processor 112) and may use various secure peripherals to accomplish the commands. In the case of operations that involve keys 562 and 564, SEP processor 530 may provide appropriate commands to cryptographic engine 550 in order to perform those operations. In various embodiments, SEP processor 530 may execute securely loaded software that facilitates implementing functionality descried with respect to SEP 114. This software may include encrypted program instructions loaded from a trusted zone in memory 120.

Secure ROM 540 is a memory configured to program instruction for booting SEP 114. In some embodiments, ROM 540 may respond to only a specific address range assigned to secure ROM 540 on local interconnect 570. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 114. In some embodiments, secure ROM 540 may include other software executed by SEP processor 530 during use. This software may include the program instructions to process inbox messages and generate outbox messages, code to interface to the cryptographic engine 310, etc.

Cryptographic engine 550 is circuitry configured to perform cryptographic operations for SEP 114, including key generation as well as encryption and decryption using keys in storage 560. Cryptographic engine 550 may implement any suitable encryption algorithm such as DES, AES, RSA, etc. In some embodiments, engine 550 may further implement elliptic curve cryptography (ECC). In various embodiments, engine 550 is responsible for generating signatures 153 discussed above.

Key storage 560 is a local memory (i.e., internal memory) configured to store keys. As shown, storage 560 may include a public key pair 562, which may be generated by engine 550 in order to produce digital signatures 153. Storage 560 may also include a device key 564 that is associated with computing device 100 and may be used to sign registration request 145. In some embodiments, storage 560 may use different techniques for the storage of keys. For example, in some embodiments, storage 560 may include a non-volatile memory for the storage of a key pair 562. In some embodiment, storage 560 includes a set of fuses that are burnt during a fabrication of SEP 114 (or more generally device 100) in order to record key 564.

Figure 6A:
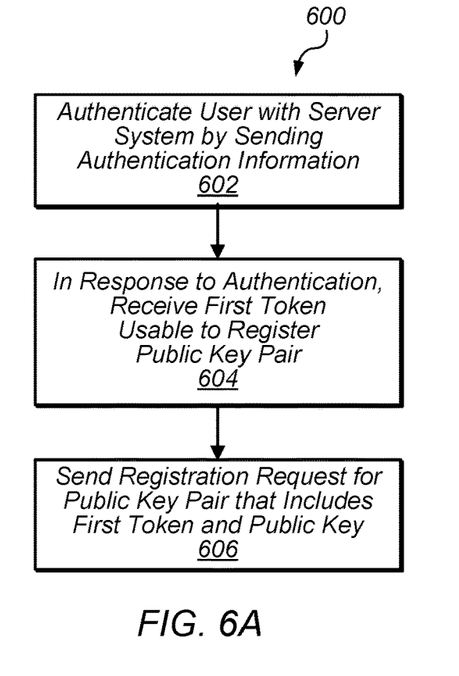
FIGS. 6A-6C are flow diagram illustrating examples of methods performed by components of the authentication system.

Turning now to FIG. 6A, a method 600 for registering a public key pair is depicted. In some embodiments, method 600 may be performed by a computing device having a secure circuit (e.g., SEP 114) configured to generate a public key pair (e.g., public key pair 462) usable to authenticate a user of the computing device. In step 602, a user is authenticated with a server system (e.g., payment system 140) by sending authentication information (e.g., information 141) supplied by the user to the server system. In step 604, a first token (e.g., authenticated token 142) is received in response to the server system verifying the authentication information, the first token being usable to register the public key pair with the server system. In step 606, a request (e.g., request 145) is sent to the server system to register the public key pair for authenticating the user. In some embodiments, the request includes the first token and identifies a public key of the public key pair. In some embodiments, step 606 may also include receiving a second token (e.g., registered key token 146) usable to verify a digital signature produced by a private key of the public key pair.

Figure 6B:
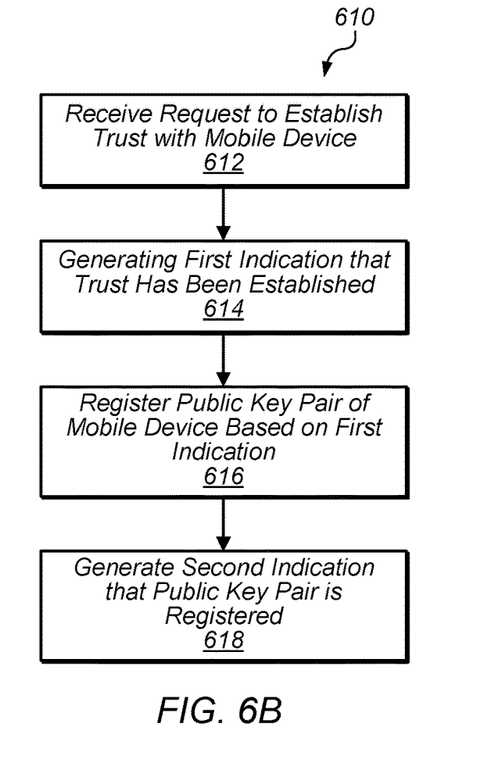

Turning now to FIG. 6B, another method 610 for registering a public key pair is depicted. In some embodiments, method 610 is performed by a computer system (e.g., payment system 140) to which a user is authenticating. In step 612, a request (e.g., a request including information 141) is received to establish trust with a mobile device (e.g., computing device 100) such that the request includes authentication information for a user of the mobile device. In step 614, a first indication (e.g., authenticated token 142) is generated in response to verifying the authentication information, the first indication specifying that trust has been established with the mobile device. In step 616, a public key pair of the mobile device is registered based on the first indication and in response to a registration request (e.g., request 145) from the mobile device that specifies a public key of the public key pair. In step 618, a second indication (e.g., registered key token 146) is generated indicating that the public key pair is registered and including information indicative of the public key.

Figure 6C:
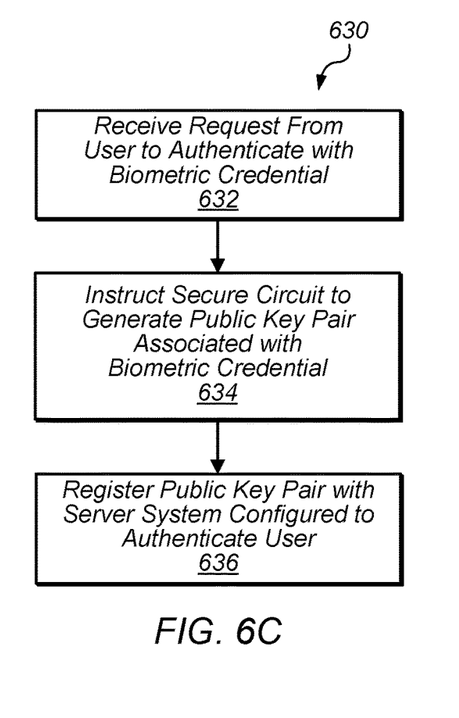

Turning now to FIG. 6C, another method 630 of registering a public key pair is depicted. In some embodiments, method 630 may be performed by an application (e.g., payment application 122) executing on a computing device. In step 632, a request is received from a user to authenticate with a biometric credential supplied by the user. In step 634, a secure circuit in the computing device is instructed (e.g., via request 143) to generate a public key pair usable to produce a digital signature in response to presentation of the biometric credential. In step 636, the public key pair is registered with a server system configured to authenticate the user by verifying the digital signature. In some embodiments, step 636 includes sending authentication information (e.g., information 141) supplied by the user via a touch screen of the computing device.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
    a processor;
    a secure circuit including cryptographic circuitry isolated from the processor, wherein the cryptographic circuitry is configured to generate a public key pair usable to authenticate a user of the computing device; and
    memory having program instructions stored therein that are executable by the processor to perform operations including:
        as a part of a first exchange with a server system to facilitate a particular type of operation for the user:
            authenticating the user with the server system by sending authentication information supplied by the user to the server system;
            in response to the server system verifying the authentication information, receiving a first token usable to register the public key pair with the server system, wherein the first token includes information signed by the server system;
            sending, to the server system, a request to register the public key pair for authenticating the user without the authentication information, wherein the request includes the first token and identifies a public key of the public key pair;
            in response to the server system verifying the first token, receiving, from the server system, an indication generated by the server system and indicating that the server system has registered the public key pair for authenticating the user without the authentication information; and
        performing a subsequent authentication of the user with the server system as a part of a second exchange with the server system to facilitate the particular type of operation for the user, wherein the subsequent authentication includes:
            the secure circuit performing a biometric authentication of the user, by the secure circuit comparing collected biometric information with previously stored biometric information;
            in response to a biometric authentication of the user, the secure circuit using a private key of the public key pair to generate a digital signature;
            sending the digital signature without sending the authentication information; and
            providing the received indication to the server system to enable the server system to verify the digital signature.

2. The computing device of claim 1, wherein the subsequent authentication includes:
    receiving a challenge from the server system;
    requesting that the secure circuit use the cryptographic circuitry to generate, with the private key of the public key pair, the digital signature for the challenge; and
    providing the digital signature generated by the cryptographic circuitry to the server system in a response to the challenge.

3. The computing device of claim 2, further comprising:
    a biosensor configured to collect the biometric information from the user;
    wherein the secure circuit is configured to:
        generate the requested digital signature based on the collected biometric information matching the previously stored biometric information.

4. The computing device of claim 2, wherein the first exchange with the server system is to facilitate a first purchase for the user, and wherein the second exchange with the server system is to facilitate a second purchase for the user.

5. The computing device of claim 2, wherein the operations include:
    performing the subsequent authentication after a restart of the computing device.

6. The computing device of claim 1, wherein the authentication information includes a value derived from a user name and password of the user.

7. The computing device of claim 1, wherein the secure circuit is configured to receive a request to generate the public key pair via a mailbox mechanism included in the secure circuit, wherein the mailbox mechanism is configured to isolate circuitry in the secure circuit from being accessed by the processor, wherein the isolated circuitry includes the cryptographic circuitry.

8. The computing device of claim 3, wherein the secure circuit and the biosensor are configured to encrypt communications between each other using a shared key.

9. The computing device of claim 1, wherein the information included in the first token comprises at least a portion of the authentication information signed by the server system.

10. The computing device of claim 1, wherein the secured circuit is configured to store, in association with the public key pair, usage criteria that indicates that the private key cannot be used to generate a digital signature without performing a biometric authentication of the user.

11. The computing device of claim 1, wherein the program instructions are executable by the processor to implement a client application that performs the operations, and wherein the operations include updating a setting of the client application to indicate that biometric authentication is to be used for subsequent exchanges with the server system to perform the particular type of operation.

12. The computing device of claim 1, wherein the authentication information and the request to register include a machine identifier that identifies the computing device.

13. The computing device of claim 1, wherein the operations include:
   in response to receiving a user request to discontinue using a biosensor to authenticate with the server system, issuing a cancellation request to the server system to unregister the public key pair.

* * * * *